United States Patent Office 3,527,699
Patented Sept. 8, 1970

3,527,699
CONDENSATE RECOVERY SYSTEM
Norman Barrett King, Wayland, Mass., assignor, by mesne assignments, to The Badger Company, Inc., Cambridge, Mass., a corporation of Delaware
Filed Aug. 20, 1965, Ser. No. 481,180
Int. Cl. B01d *11/00*
U.S. Cl. 210—21
9 Claims

ABSTRACT OF THE DISCLOSURE

Styrene contaminated condensate water is purified for reuse by removing the styrene first by contacting the water with ethylbenzene as a styrene solvent and then in a preferred final step the water is steam stripped to remove the ethylbenzene solvent.

---

Figure 1:
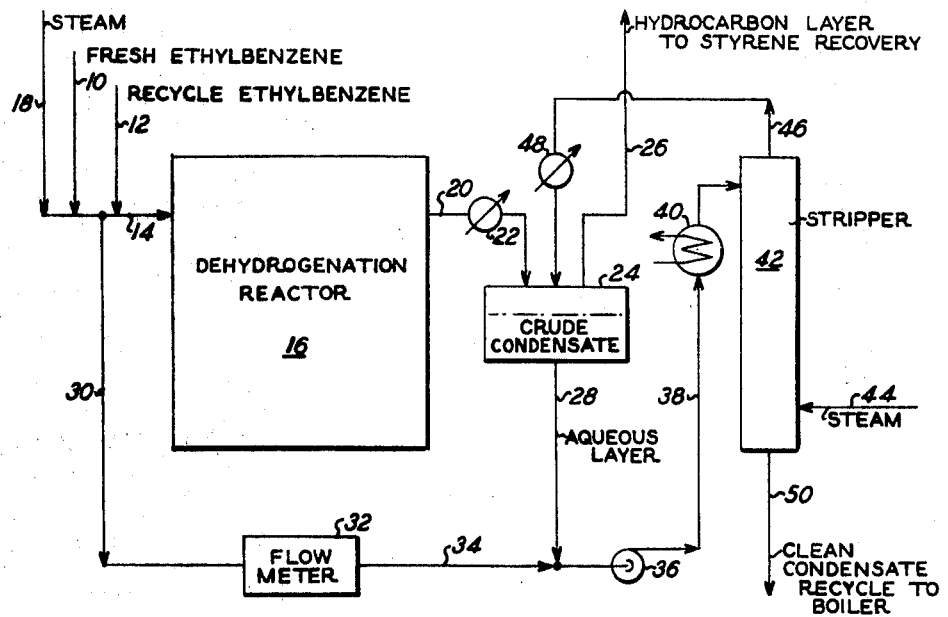

This invention relates to a method of recovering clean condensate water from crude styrene reactor condensate mixtures formed in catalytic contact of ethylbenzene in its catalytic dehydrogenation using several volumes of steam as a carrier gas and heat transfer agent, and particularly to removal of small quantities of polymerizable styrene contained in the condensate water.

In the catalytic dehydrogenation of ethylbenzene in passage at raised temperatures over a catalytic contact to convert it to styrene, large volumes of steam are conventionally mixed with it as a heat transfer agent, diluent and carrier gas. While the hydrocarbon reaction product comprising ethylbenzene and styrene is substantially separable from the condensate water, small quantities of styrene do remain dissolved or suspended in the water. Styrene polymerizes readily with heat to polystyrene, and even such minor contaminating quantities as may remain in the condensate water after separation of most of the hydrocarbon components of the reaction mixture, in continuous handling of large volumes of condensate water, allow ultimate formation of polystyrene in large enough quantity to settle out and plug valves, pumps and heat exchangers, and, particularly, may coat out upon boiler tubes. Hence, condensate water obtained in very large quantity following styrene formation causes so much trouble in the fouling of apparatus units by depositing as polymerized styrene products that the used condensate is usually discarded or diverted to a usage suitable for oily, contaminated water rather than reused as boiler-feed water.

According to the present invention, it is found that important economies are available in treatment of the condensate water, after separation of the hydrocarbon reaction product, to remove the small contaminating quantity of polymerizable styrene that remains substantially dissolved in the condensate water, whereby the water is usefully recycled and re-used by re-boiling to steam in the dehydrogenation system without fouling the system with polymer.

According to this invention, styrene-contaminated condensate water, after separation of the hydrocarbon dehydrogenation reaction product layer, is mixed with a small quantity of fresh ethylbenzene sufficient to extract last traces of dissolved styrene. The mixed water and hydrocarbon liquids may then be passed to a steam stripper, and the hydrocarbon solution of fresh ethylbenzene containing the extracted traces of styrene dissolved therein are stripped from the condensate with fresh steam. The clean condensate is withdrawn from the stripper as bottoms, and the steam stripped hydrocarbon solution is returned to the dehydrogenation system such as to the crude reaction product condensate receiver from the dehydrogenation reactor.

In an alternate procedure, the fresh stream of ethylbenzene added to the contaminated condensate water may be agitated therewith in a liquid-liquid extraction tank, and the hydrocarbon extract phase is first withdrawn in a mechanical separation therefrom, returning the hydrocarbon extract phase to the dehydrogenation system, and the relatively purer condensate raffinate phase may then be treated in a stripper with steam to drive off only the remaining traces of hydrocarbon, in this case substantially small residues of ethylbenzene.

In either case, clean condensate water is produced by contacting the contaminated condensate water with a small amount of fresh ethylbenzene to dissolve the styrene followed by steam stripping. The ethylbenzene is preferably obtained as a small side stream drawn from the original feed stream to the dehydrogenation reactor. The solution of the small quantity of styrene in ethylbenzene formed in the treatment as an extract can be returned either to the fresh ethylbenzene feed stream to the dehydrogenation reactor, since it contains only a small quantity of styrene, or it may be returned to the crude reaction mixture condensate product. Since all of the hydrocarbon is eventually returned to the reaction system and utilized to produce styrene product, the disposition of the ethylbenzene-styrene solution is not critical.

There are several unusual advantages in the present invention. The ethylbenzene is a superior solvent and a stream of ethylbenzene is easily available in the subject process for the purpose. The ethylbenzene greatly diluting the small traces of styrene tends immediately to inhibit any tendency of the styrene to polymerize, whereby the solution of styrene in ethylbenzene is easily distilled, i.e. stripped from the condensate with steam without polymerization problems. A further inherent advantage is that both styrene and ethylbenzene are steam volatile and easily stripped by contacting the hot condensate water with a moderate amount of steam for easy steam purification to separate the small quantity of hydrocarbon used in the purification thereof. Since ethylbenzene and styrene exhibit similar volatilities with respect to water, the stripping of both proceeds at approximately the same rate and the styrene does not tend to concentrate in either liquid or vapor phase.

The styrene solution in ethylbenzene is typical of solutions already available in the dehydrogenation system and is easily handled for disposal in any stage whether by passing to the dehydrogenation reaction product, to the ethylbenzene recycle stream, or to the fresh feed stream to the dehydrogenation reactor.

Accordingly, a primary object of the invention is to produce clean condensate water by contact of crude styrene-contaminated condensate water of an ethylbenzene dehydrogenation system with small but sufficient quantities of ethylbenzene to extract the dissolved styrene, thereby producing clean condensate.

A further object is to strip residual hydrocarbon, substantially ethylbenzene, from the extracted condensate to produce clean condensate water for recycle to the system.

Figure 2:
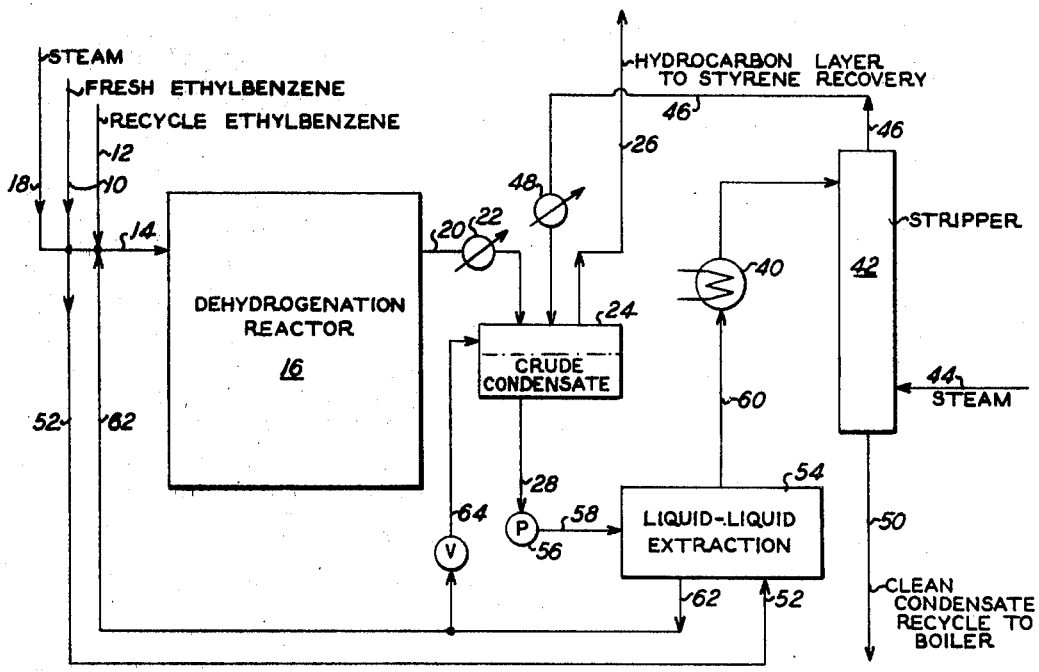

Other advantages and objects will be inherent in the ensuing description made in conjunction with the drawings wherein:

FIG. 1 illustrates a flow diagram comprising a styrene dehydrogenation system wherein the ethylbenzene is co-mingled with crude styrene-contaminated condensate and the mixture is stripped with steam to produce clean steam condensate; and FIG. 2 is a diagram of an alternate system wherein the ethylbenzene mixture with contaminated condensate is first separated in a liquid-liquid extract system and the Sept. 8, 1970        N. B. KING        3,527,699

CONDENSATE RECOVERY SYSTEM

Filed Aug. 20, 1965

INVENTOR

NORMAN B. KING

BY *Sol B. Wiese*

ATTORNEY the contaminated condensate water is first separated from the condensate water mechanically in a liquid-liquid extraction system and the raffinate condensate water is then steam stripped to remove additional quantities of contaminated hydrocarbon.

5. In a method of catalytically dehydrogenating ethylbenzene in a hot diluent carrier gas of steam to produce a reaction product comprising crude styrene contaminated condensate water, the steps of purifying said condensate water by commingling the same with a small side stream of ethylbenzene withdrawn from the ethylbenzene feed to the system, and then steam stripping the ethylbenzene solution from said condensate water.

6. The method of claim 5 wherein the steam stripped hydrocarbon vapors are condensed and returned to said crude reaction product.

7. In a method of catalytically dehydrogenating ethylbenzene in a hot diluent carrier gas of steam to produce a reaction product comprising crude styrene contaminated condensate water, the steps of purifying said condensate water by commingling the same with a small side stream of ethylbenzene withdrawn from the ethylbenzene feed to the system, separating an extract phase of the ethylbenzene in a liquid-liquid extraction from the raffinate condensate water and then further purifying said raffinate condensate water by steam stripping.

8. The method of claim 7 wherein the ethylbenzene extract phase is returned to the ethylbenzene feed to the dehydrogenation system.

9. The method of claim 7 wherein the steam stripped hydrocarbon vapors are condensed and returned to said crude reaction product.

References Cited
UNITED STATES PATENTS

| | | | |
|---|---|---|---|
| 2,773,003 | 12/1956 | Brown et al. | 210—21 X |
| 2,851,502 | 9/1958 | Bowman et al. | 260—669 |
| 2,927,075 | 3/1960 | Brown | 210—21 X |
| 2,999,808 | 9/1961 | Brown | 210—21 X |
| 3,449,244 | 6/1969 | Clay et al. | 210—21 |

REUBEN FRIEDMAN, Primary Examiner

F. A. SPEAR, JR., Assistant Examiner

U.S. Cl. X.R.

260—669